(12) United States Patent
Han

(10) Patent No.: US 11,412,846 B2
(45) Date of Patent: Aug. 16, 2022

(54) HOME ENVIRONMENT REGULATION SYSTEM BASED ON FURNITURE HAVING DISPLAY DEVICES AND CONTROL METHOD THEREOF

(71) Applicant: Houhua Han, Hubei (CN)

(72) Inventor: Houhua Han, Hubei (CN)

(\*) Notice: Subject to any disclaimer, the term of this patent is extended or adjusted under 35 U.S.C. 154(b) by 216 days.

(21) Appl. No.: 16/599,112

(22) Filed: Oct. 10, 2019

(65) Prior Publication Data

US 2020/0037760 A1 Feb. 6, 2020

Related U.S. Application Data

(63) Continuation of application No. PCT/CN2018/082371, filed on Apr. 9, 2018.

(30) Foreign Application Priority Data

Dec. 27, 2017 (CN) .......................... 201711440125.6

(51) Int. Cl.
*G09F 11/02* (2006.01)
*A47B 47/00* (2006.01)
(Continued)

(52) U.S. Cl.
CPC .......... *A47B 47/0091* (2013.01); *G09F 11/02* (2013.01); *H04L 12/282* (2013.01);
(Continued)

(58) Field of Classification Search
CPC .......... A47B 47/0061; A47B 2096/207; A47B 2096/208; G09F 11/02; G09F 2011/0009
See application file for complete search history.

(56) References Cited

U.S. PATENT DOCUMENTS 3,109,250 A \* 11/1963 Hill ..................... A63H 33/3027
40/471
4,002,831 A \* 1/1977 Aeschliman ............. H04N 5/64
348/836
(Continued)

FOREIGN PATENT DOCUMENTS

| CN | 2156560 Y | 2/1994 |
| CN | 201130499 Y | 10/2008 |
| CN | 202104555 U | 1/2012 |

OTHER PUBLICATIONS

International Search Report of PCT Patent Application No. PCT/CN2018/082371 dated Jun. 15, 2018.

*Primary Examiner* — Gary C Hoge
(74) *Attorney, Agent, or Firm* — Andrew C. Cheng

(57) ABSTRACT

A home environment regulation system and a control method, comprising pieces of furniture (1) arranged in a home environment. Each piece of furniture (1) comprises a furniture body (11) and a display device. An accommodating cavity (13) is provided within the furniture body (11). A transparent body (12) is provided on the surface of the furniture body (11). The transparent body (12) is provided at an opening of the accommodating cavity (13). The display device is provided within the accommodating cavity (13). The display device comprises a picture display module (14) and a driver module (15). The picture display module (14) is connected to the driver module (15). The picture display module (14) is provided with display pictures of various colors and images. The display pictures on the picture display module (14) face the transparent body (12).

17 Claims, 7 Drawing Sheets

(51) Int. Cl.
*H04L 12/28* (2006.01)
*A47B 96/20* (2006.01)
*G09F 11/00* (2006.01)

(52) U.S. Cl.
CPC .... *H04L 12/2812* (2013.01); *A47B 2096/207* (2013.01); *A47B 2096/208* (2013.01); *G09F 2011/0009* (2013.01)

(56) References Cited

U.S. PATENT DOCUMENTS

| | | | | |
|---|---|---|---|---|
| 5,488,791 | A * | 2/1996 | Boni | G09F 11/21 |
| | | | | 40/467 |
| 2004/0025676 | A1* | 2/2004 | Shadd | G10H 3/18 |
| | | | | 84/743 |
| 2008/0005941 | A1* | 1/2008 | Primiano | G09F 11/18 |
| | | | | 40/471 |
| 2010/0268792 | A1* | 10/2010 | Butler | G06Q 30/0269 |
| | | | | 709/217 |
| 2012/0193041 | A1* | 8/2012 | Sun | G09F 11/21 |
| | | | | 160/241 |
| 2017/0061521 | A1* | 3/2017 | Lee | G06F 3/04817 |
| 2017/0156499 | A1* | 6/2017 | Kane | A47B 96/20 |
| 2017/0261248 | A1* | 9/2017 | Koo | F25D 29/005 |
| 2018/0124930 | A1* | 5/2018 | Sisson | E06B 5/006 |

* cited by examiner

HOME ENVIRONMENT REGULATION SYSTEM BASED ON FURNITURE HAVING DISPLAY DEVICES AND CONTROL METHOD THEREOF

CROSS REFERENCE TO RELATED APPLICATIONS

The present application is a Continuation Application of PCT Application No. PCT/CN2018/082371 filed on Apr. 9, 2018, which claims the benefit of Chinese Patent Application Nos. 201720365540.9 filed on Apr. 10, 2017, 201710503941.0 filed on Jun. 21, 2017, 201710703424.8 filed on Aug. 16, 2017, 201710857323.6 filed on Sep. 20, 2017, 201711292402.3 filed on Nov. 28, 2017, 201711440125.6 filed on Dec. 27, 2017 and 201810202985.4 filed on Mar. 12, 2018. All the above are hereby incorporated by reference.

FIELD OF THE INVENTION

The present invention relates to the technical field of home technology, in particular to a home environment regulation system based on furniture having display units and a control method thereof.

BACKGROUND OF THE INVENTION

In modern society, with the rapid development of material civilization, people's demand for quality of life is getting higher and higher, pursuing the individualization of interior decoration and home, and paying more attention to the richness and convenience of home life. As an important part to create a home environment, furniture is constantly updated and improved in function, color and style, in order to meet the requirements of different aesthetic concepts, thereby meeting the diverse needs of users.

However, in the prior art, the furniture disposed in the living space is unchangeable in its colors and fixed pictures, so that the home environment is presented in people's vision only in a fixed form. Therefore, if the home environment that integrates furniture and the whole living space can only constitute a single living artistic conception, with the increase of the use time, people will easily become aesthetic fatigue, gradually losing the freshness of the home environment. Such furniture is difficult to satisfy people's pursuit of different living artistic conception, leading to poor user experience.

SUMMARY OF THE INVENTION

The present invention provides a home environment regulation system based on furniture having display units and a control method thereof, so as to solve the technical problems that the existing home environment can only constitute a single living artistic conception, people will easily become aesthetic fatigue, and the user experience is poor, such that the home environment are effectively changed in colors, pictures and the like, to form different living artistic conception, thereby satisfying people's needs and improving user experience.

In order to solve the above technical problems, the present invention provides a home environment adjustment system based on furniture having display units, comprising a plurality of pieces of furniture arranged in a home environment, each piece of furniture comprises a furniture body and a display unit; an accommodating cavity is provided within the furniture body, a surface of the furniture body is provided with a transparent body which is provided at an opening of the accommodating cavity;

the display unit is provided in the accommodating cavity or on a surface of the accommodating cavity, and comprises a picture display module and a driver module, the picture display module is connected to the driver module and provided with display pictures having various colors and patterns, the display pictures on the picture display module face the transparent body, and the picture display module is driven by the driver module to change the display picture;

when the home environment is changed according to user requirements, the driver modules of the plurality of pieces of furniture drive the respective picture display modules to change the display pictures, so that the display pictures of the plurality of pieces of furniture are changed, thereby realizing change of the home environment.

In a preferred embodiment, the picture display module includes a multi-picture display canvas; the driver module includes a microcontroller, a motor and a rotating shaft, the microcontroller is connected to the motor, an output end of the motor is connected to the rotating shaft, and the rotating shaft rotatably support a bottom surface of the multi-picture display canvas; when the home environment is changed according to the user requirements, the motor receives a picture change instruction issued by the microcontroller, and controls rotation of the rotating shaft to drive the multi-picture display canvas to move, thereby changing the display picture on the multi-picture display canvas.

In a preferred embodiment, the driver module further comprises a fixing base and a power supply; the rotating shaft comprises a driving shaft and a driven shaft; the fixing seat is connected to a side wall of the accommodating cavity, the motor is connected to the fixing base, the power supply is connected to the microcontroller, and the driving shaft and the driven shaft are rotatably connected to the fixing base; one end of the multi-picture display canvas is rotatably wound on the driving shaft, and the other end of the multi-picture display canvas is rotatably wound on the driven shaft; output shafts of the motor are respectively connected to the driving shaft and the driven shaft through transmission gears; when the home environment is changed according to the user requirements, the motor receives a picture change instruction issued by the microcontroller, and drives the driving shaft and the driven shaft to rotate in the same direction through transmission of the transmission gears, so as to drive the multi-picture display canvas to move, thereby changing the display picture on the multi-picture display canvas.

In a preferred embodiment, the picture display module further comprises a position sensor which is connected to the microcontroller, positions between adjacent display pictures on the multi-picture display canvas are provided with the position sensor and a positioning recognizer transmitting a positioning signal, the positioning signal is acquired and transmitted to the microcontroller by the position sensor, and the microcontroller controls the motor to stop moving according to the positioning signal.

In a preferred embodiment, the picture display module further comprises a position sensor and two direction sensors, the position sensor and the two direction sensors are connected to the microcontroller, a position between adjacent display pictures on the multi-picture display canvas is provided with a first positioning member for identifying a positioning signal by the position sensor; the positioning signal is acquired and transmitted to the microcontroller by the position sensor, and the microcontroller controls the motor to stop moving according to the positioning signal, so that an old display picture is changed to a new one;

two second positioning members for identifying reverse signals by the direction sensors are provided at both ends of the multi-picture display canvas; the reverse signals are recognized and transmitted to the microcontroller by the direction sensors, and the microcontroller controls the motor to rotate in a reverse direction according to the reverse signals;

the multi-screen display canvas is made of plastic, cotton, fiber, hair, or any combination thereof.

In a preferred embodiment, the picture display module comprises a flexible display screen, the driver module comprises a display controller and a memory; the flexible display screen is connected to the display controller, and the display controller is connected to the memory; when the home environment is changed according to the user requirements, the display controller receives a control instruction, acquires picture information in the memory, and transmits the picture information to the flexible display screen, thereby changing the display picture on the flexible display screen.

In a preferred embodiment, the picture display module includes a multi-picture display canvas; the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned through the rotation of the rotating member to move the multi-picture display canvas between the first turnable member and the second turnable member, thereby changing the display picture on the multi-picture display canvas.

In a preferred embodiment, the rotating member comprises a pull rope rotating member which comprises a clamping member, a drawstring, and a sheet spring; the clamping member is fixed to one end of the first turnable member, the sheet spring is mounted on the clamping member, one end of the drawstring is provided with a drawstring handle, and the other end of the drawstring is wound on the sheet spring; when the home environment is changed according to the user requirements, the drawstring is pulled through the drawstring handle to drive the sheet spring to tighten, so that the first turnable member turns, and the multi-picture display canvas moves between the first turnable member and the second turnable member, thereby changing the display picture on the multi-picture display canvas.

In a preferred embodiment, the display unit further comprises a wireless control module having a function of receiving a control signal from a remote controller or a mobile terminal, and the wireless control module is wirelessly connected to the driver module; the wireless control module is a wireless WiFi module, an infrared control module or a bluetooth module;

the furniture body is provided with an automatic switch unit which comprises an induction module, a switch control module and a load-bearing part; the switch control module comprises an induction controller and an induction machine; an output end of the induction module is connected to the induction controller, the induction controller is connected to the induction motor, the carrier is movably connected to an output shaft of the induction motor through a screw sliding assembly, and the load-bearing part is provided with a garbage bin.

In a preferred embodiment, a periphery of the transparent body is provided with a color body, and the color body covers a periphery of the picture display module which is a multi-screen display canvas or a flexible display screen.

In a preferred embodiment, the furniture is a cupboard door, the cupboard door comprises the furniture body, i.e., a cupboard door body, and the cupboard door is provided with the accommodating cavity, and the transparent body is provided at an opening of the accommodating cavity;

the display unit is disposed in the accommodating cavity or on a surface of the accommodating cavity, and comprises a picture display module and a driver module, the picture display module is connected to the driver module and comprises display pictures having various colors and patterns, the display pictures on the picture display module face the transparent body, and the picture display module is driven by the driver module to change the display pictures;

a periphery of the transparent body is provided with a color body, and the color body covers a periphery of the picture display module which is a multi-screen display canvas or a flexible display screen;

the cupboard door is an automatic cupboard door disposed on the cupboard body, the automatic cupboard door is rotatably connected to the cupboard body, and a garbage bin is provided on an inner side wall of the automatic cupboard door;

when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatablely supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas;

or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

In a preferred embodiment, the furniture is a cabinet, the cabinet comprises the furniture body which is a cabinet body, a side wall of the cabinet body and a cabinet door are respectively provided with the accommodating cavity, and the transparent body is provided at an opening of the accommodating cavity;

the display unit is disposed in the accommodating cavity or on a surface of the accommodating cavity, and comprises a picture display module and a driver module; the picture display module is connected to the driver module and comprises display pictures having various colors and patterns, the display pictures on the picture display module face the transparent body, and the picture display module is driven by the driver module to change the display pictures;

a periphery of the transparent body is provided with a color body, and the color body covers a periphery of the picture display module which is a multi-screen display canvas or a flexible display screen;

the cabinet door is an automatic cabinet door disposed on the cabinet body, the automatic cabinet door is rotatably connected to the cabinet body, and a garbage bin is provided on an inner side wall of the automatic cabinet door;

when the picture display module is a multi-picture display canvas, the driver module includes a microcontroller, a motor and a rotating shaft, the microcontroller is connected to the motor, an output end of the motor is connected to the rotating shaft, and the rotating shaft rotatablely supports a bottom surface of the multi-picture display canvas; when the home environment is changed according to the user requirements, the motor receives a picture change instruction issued by the microcontroller, and controls rotation of the rotating shaft to drive the multi-picture display canvas to move, thereby changing the display picture on the multi-picture display canvas;

or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

In a preferred embodiment, the furniture is a door which comprises the furniture body comprising a door frame and a door panel, one side of the door panel is rotatably connected to the door frame, and the other side of the door panel is provided with a door lock and a door handle; a side wall of the door panel is provided with the accommodating cavity, and a transparent body is provided at an opening of the accommodating cavity;

the display unit is disposed in the accommodating cavity or on a surface of the accommodating cavity, which comprises a picture display module and a driver module, the picture display module is connected to the driver module and provided with display pictures having various colors and patterns, the display pictures on the picture display module face the transparent body, and the picture display module is driven by the driver module to change the display pictures;

a periphery of the transparent body is provided with a color body, and the color body covers a periphery of the picture display module which is a multi-screen display canvas or a flexible display screen;

when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatablely supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas;

or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

In a preferred embodiment, the furniture is a window which comprises the furniture body comprising a window gate, the window gate is provided with the accommodating cavity, and a transparent body is provided at an opening of the accommodating cavity;

the display unit is disposed in the accommodating cavity or on a surface of the accommodating cavity, and comprises a picture display module and a driver module, the picture display module is connected to the driver module and provided with display pictures of various colors and images, the display pictures on the picture display module face the transparent body, and the picture display module is driven by the driver module to change the display pictures;

a periphery of the transparent body is provided with a color body, and the color body covers a periphery of the picture display module which is a multi-screen display canvas or a flexible display screen;

when the picture display module is a multi-picture display canvas, the driver module includes a microcontroller, a motor and a rotating shaft, the microcontroller is connected to the motor, an output end of the motor is connected to the rotating shaft, and the rotating shaft rotatablely supports a bottom surface of the multi-picture display canvas; when the home environment is changed according to the user requirements, the motor receives a picture change instruction issued by the microcontroller, and controls rotation of the rotating shaft to drive the multi-picture display canvas to move, thereby changing the display picture on the multi-picture display canvas;

or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

In a preferred embodiment, the furniture is a table or a tea table;

when the furniture is a table, the table comprises the furniture body, i.e, a table body, one side wall of the table body is provided with the accommodating cavity, and the transparent body is provided at an opening of the accommodating cavity;

when the furniture is a tea table, the tea table comprises the furniture body, one side wall of the furniture body is provided with the accommodating cavity, and the transparent body is provided at an opening of the accommodating cavity;

wherein, the display unit is disposed in the accommodating cavity or on a surface of the accommodating cavity, and comprises a picture display module and a driver module, the picture display module is connected to the driver module and comprises display pictures of various colors and images, the display pictures on the picture display module face the transparent body, and the picture display module is driven by the driver module to change the display pictures;

a periphery of the transparent body is provided with a color body, and the color body covers a periphery of the picture display module which is a multi-screen display canvas or a flexible display screen;

when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatablely supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas;

or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

In order to solve the same technical problems, the present application also provides a control method of a home environment regulation system based on furniture having display units, comprising steps of:

obtaining current display picture information of a plurality of pieces of furniture arranged in the home environment;

determining whether the home environment needs to be changed according to user requirements;

when it is determined that the home environment is changed, driver modules of the plurality of pieces of furniture driving respective picture display modules to change display pictures, so that the display pictures of the plurality of pieces of furniture are changed, thereby realizing changes in the home environment;

wherein, the picture display modules of the plurality of pieces of furniture are coordinated to form the home environment, and the home environment is displayed on the picture display modules by using pictures, video clips, book pictures, and album pictures, supplemented by text and sound description to highlight a living environment, function, instructions for use and artistic conception constituted the pieces of furniture.

In a preferred embodiment, the step of when it is determined that the home environment is changed, driver modules of the plurality of pieces of furniture driving respective picture display modules to change display pictures, so that the display pictures of the plurality of pieces of furniture are changed, thereby realizing changes in the home environment in particular comprises:

determining whether to change the home environment by changing part of or all of the display pictures of the pieces of furniture;

when it is determined to change the home environment by changing part of the display pictures of the pieces of furniture, controlling the driver modules of part of the furniture to drive the respective picture display modules to change the display pictures on the picture display modules, thereby achieving partial change in the home environment by changing part of the display pictures on the furniture;

when it is determined to change the home environment by changing all of the display pictures of the pieces of furniture, controlling the driver modules of all pieces of furniture to drive the respective picture display modules to change the display pictures on the picture display modules, thereby achieving overall change in the home environment by changing the display pictures on all the pieces of furniture.

Compared with the prior art, the embodiments of the present invention have the beneficial effects that combination of the display units with the furniture bodies solves the problem that the home environment can only constitute a single living artistic conception due to monotonous colors and patterns of the traditional furniture; in the same home environment, when a user wants to experience different home environments with different living artistic conception, the display pictures on the plurality of pieces of furniture can be changed by the display units, and changes in the display pictures on the plurality of pieces of furniture arranged in the home environment brings changes in the home environment, creating different living artistic conception, maintaining the user's freshness of the home environment, and thus improving the user experience;

Besides, the display pictures on the picture display modules face the transparent bodies which can be transparent glass, transparent rubber, or the like in the furniture; the light with signals of the display pictures pass through the transparent bodies to enter people's vision, the display pictures of the plurality of pieces of furniture together constitute the home environment and create a living artistic conception; at the same time, the plurality of pieces of furniture in the home environment change the display pictures on each piece of furniture in factors such as its patterns, colors, styles and the like, which constitute abundant and various living artistic conception, and help to maintain people's freshness of home environment, thereby effectively improving the user experience and satisfying people's aesthetic requirements;

Furthermore, the display pictures on the picture display modules can be set according to people's preferences, so that there may be a plurality of display pictures having different colors and patterns; preferably, the display pictures on the picture display modules can together create a variety of living artistic conception with different colors and styles, which greatly meets people's needs; also, the users do not need to change their furniture to change the living artistic conception, change of the living artistic conception can be changed with the same furniture through the technical solution of the present application, which not only saves the decoration cost of home life, but also improves the user experience.

Wherein, the picture display modules of the plurality of pieces of furniture are coordinated to form the home environment, and the home environment is displayed on the picture display modules by using pictures, video clips, book pictures, and album pictures, supplemented by text and sound description, to highlight a living environment, function, instructions for use and artistic conception constituted the plurality of pieces of furniture. The pictures, video clips, texts and sounds are generated by camera or video camera, and compiled with the existing technology APP softwares.

In the present invention, pieces of furniture with different shapes and display units can be assembled, in forms of up and down fitting, right and left fitting, inner and outer chimerism, mortise-and-tenon joint, and the like, to form an integrated single-application furniture. Moreover, the furniture of the present invention uses the furniture made by the existing technologies as its application source, the existing technologies include shapes, surface extension, materials, functions, manufacturing processes, procedures, etc. The furniture with display units of the present invention may use the structure disclosed in the present invention or structures obtained by existing technologies in the art as application sources.

Figure 1:
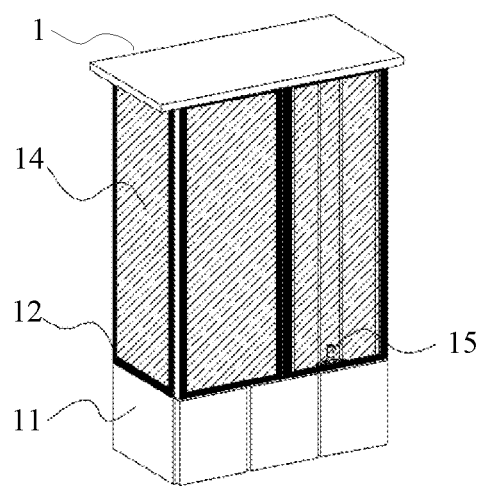
FIG. 1 is a schematic structural view of a first embodiment of a piece of furniture according to the present invention.

wherein the reference numerals in the drawings of the specification are as follows:

1, furniture; 11, furniture body; 12, transparent body; 13, accommodating cavity; 14, picture display module; 141, multi-picture display canvas; 142, first turnable member; 143, second turnable member; 144, rotating member; 1441, movable moving body; 1442, electric rotating mechanism; 145, drawstring type turnable member; 1451, clamping member; 1452, drawstring; 1453, sheet spring; 1454, drawstring handle; 146, flexible display screen; 147, display controller; 15, driver module; 151, microcontroller; 152, motor; 153, driving shaft; 154, driven shaft; 155, position sensor; 156, direction sensor; 157, power supply; 158, transmission gear; 16, cabinet door; 17, sheet-shaped plate; 18, garbage bin;

2, load-bearing part; 21, induction machine; 22, hollow screw fixing seat; 23, screw; 24, door handle; 25, door body; 251, door picture; 252, door;

3, wall; 31, ground; 32, wall cover; 33, cabinet-type furniture; 34, sofa; 35, tea table; 36, ground picture; 37, low-angle cabinet; 38, TV cabinet; 39, frame mural painting.

DETAILED DESCRIPTION OF PREFERRED EMBODIMENTS

The specific embodiments of the present invention are further described in detail below with reference to the drawings and examples. The following examples are intended to illustrate the invention but are not intended to limit the scope of the present invention.

In the description of the present invention, all technical and scientific terms used herein have the same meaning as commonly understood by those skilled in the art to which the invention belongs. The terminology used in the description of the present invention is for the purpose of describing particular embodiments and is not intended to limit the invention. The term "and/or" as used herein includes any and all combinations of one or more of the associated listed items. In addition, the terms "left", "right", "upper", "lower", "inside", etc. indicate the orientation or positional relationship based on the orientation or positional relationship shown in the drawings, only for the convenience of describing the present invention and simplifying the description, rather than indicating or implying that the device or element referred to must have a specific orientation and in a particular direction, therefore, they cannot be understood as a limitation of the present invention. Furthermore, the terms "installation" and "connection" should be understood broadly. For example, it may be a fixed connection, a detachable connection, or an integral connection; or it may be a mechanical connection or an electrical connection; or it may be a direct connection, or indirect connection through an intermediate medium; or it may be internal connection between two components. The specific meaning of the above terms in the present invention can be understood in a specific case by those skilled in the art. Further, the technical features involved in different embodiments of the present invention described below may be coordinated with each other as long as they do not constitute a conflict with each other.

Figure 2:
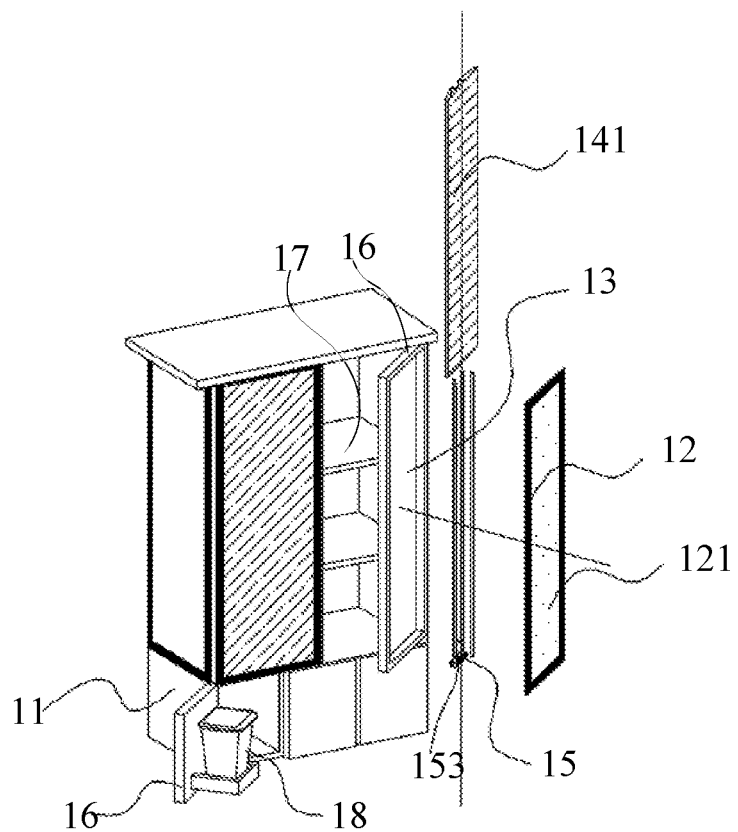
FIG. 2 is an exploded view of a first embodiment of a piece of furniture according to the present invention.
Figure 3:
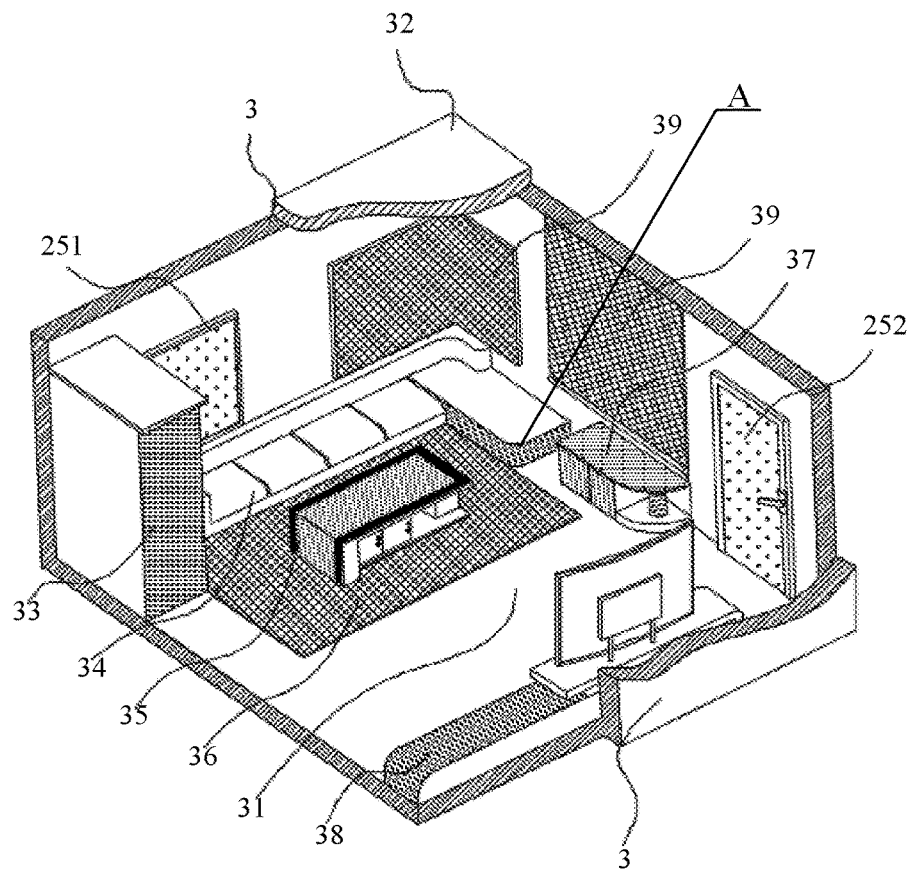
FIG. 3 is a schematic structural view of a home environment constituted by a plurality of pieces of furniture according to the present invention.

Refer to FIGS. 1 to 3, a preferred embodiment of the present invention provides a home environment regulation system comprising a plurality of pieces of furniture 1 arranged in a home environment, each piece of furniture 1 comprises a furniture body 11 and a display unit; an accommodating cavity 13 is provided within the furniture body 11, a surface of the furniture body 11 is provided with a transparent body 12 which is provided at an opening of the accommodating cavity 13;

the display unit is provided in the accommodating cavity 13 or on a surface of the accommodating cavity 13, and comprises a picture display module 14 and a driver module 15, the picture display module 14 is connected to the driver module 15 and provided with display pictures having various colors and patterns, the display pictures on the picture display module 14 face the transparent body 12, and the picture display module 14 is driven by the driver module 15 to change the display picture;

when the home environment is changed according to user requirements, the driver modules 15 of the plurality of pieces of furniture 1 drive the respective picture display modules 14 to change the display pictures, so that the display pictures of the plurality of pieces of furniture 1 are changed, thereby realizing change of the home environment.

In the embodiment of the present application, combination of the display units with the furniture bodies 11 solves the problem that the home environment can only constitute a single living artistic conception due to monotonous colors and patterns of the traditional furniture; in the same home environment, when a user wants to experience different home environments with different living artistic conception, the display pictures on the plurality of pieces of furniture 1 can be changed by the display units, and changes in the display pictures on the plurality of pieces of furniture 1 arranged in the home environment brings changes in the home environment, creating different living artistic conception, maintaining the user's freshness of the home environment, and thus improving the user experience;

Besides, the display pictures on the picture display modules 14 face the transparent bodies 12 which can be transparent glass, transparent rubber, or the like in the furniture; the light with signals of the display pictures passes through the transparent bodies 12 to enter people's vision, the display pictures of the plurality of pieces of furniture 1 together constitute the home environment and create a living artistic conception; at the same time, the plurality of pieces of furniture 1 in the home environment change the display pictures on each piece of furniture in factors such as its patterns, colors, styles and the like, which constitute abundant and various living artistic conception, and help to maintain people's freshness of home environment, thereby effectively improving the user experience and satisfying people's aesthetic requirements;

Furthermore, the display pictures on the picture display modules 14 can be set according to people's preferences, so that there may be a plurality of display pictures having different colors and patterns; preferably, the display pictures on the picture display modules 14 can together create a variety of living artistic conception with different colors and styles, which greatly meets people's needs; also, the users do not need to change their furniture to change the living artistic conception, change of the living artistic conception can be changed with the same furniture through the technical solution of the present application, which not only saves the decoration cost of home life, but also improves the user experience.

Refer to FIG. 3, it can be understood that, in order to experience different living artistic conceptions and life scenes in the same living environment, users can change the display pictures of the plurality of pieces of furniture 1 at any time according to their preferences, temperaments and life scenes, which constitutes different atmosphere of home environment, such as a quiet, intense, scientific and technological, or fashionable home environment, meeting the users' requirements on comfort and freshness.

Refer to FIG. 2, in the embodiment of the present invention, it is to be noted that the transparent body 12 includes, but is not limited to, transparent glass, transparent plastic, and other materials, which have functions of protecting the surface of the furniture 1 and showing the display picture on the picture display module 14. It should be understood that the transparent body 12 should be provided on the surface or side face of the furniture 1, such as the desktop or the side face of the tea table 35. An accommodating cavity 13 for accommodating the display unit is formed within the furniture 1, to improve compactness of the furniture 1. Meanwhile, the transparent body 12 should be disposed over the display picture of the picture display module 14 to enable the user to see the display picture through the transparent body 12. Lights of colors, patterns, and the like of the display pictures passes through the transparent body 12 to the home environment, and are interlaced and integrated into the living artistic conception in the home environment.

Specifically, the material of the transparent body 12 may be quartz glass and plastic material, and the shape of the transparent body 12, provided on the surface of the furniture, may be a flat geometric shape, such as a single-line-shaped geometry, L-shaped geometry, O-shaped geometry, M-shaped geometry, C-shaped geometry, D-shaped geometry, or E-shaped geometry. The term "surface" as used herein refers to one of the six-sided azimuth planes or one arbitrarily selected plane of an object. One or more of the transparent bodies 12 may be spliced into geometries with different shapes, alternatively, one or more layers of the transparent bodies 12 may be overlapped on the furniture body 11. The transparent body 12 may be provided with color bodies of other substances, and the color bodies may be monochromatic or colourful, and provided on the edge of the transparent body 12 in different shapes. Different color bodies may have materials of paints, plastic stickers, cloth, etc., and be surface-mounted on the edge of transparent body.

In the actual production of the furniture 1, the display unit, the furniture body 11 and the transparent body 12 are integrated by means of nailing, mortise-and-tenon joint plate bodies, glue bonding, mortise-and-tenon fixing, insertion by metal shafts, magnetic connection, hole fitting, upper and lower combination, left and right combination, and the like, into a new type of furniture capable of changing its display picture.

In addition, a periphery of the transparent body 12 is provided with a color body, and the color body covers a periphery of the picture display module 14 which is a multi-screen display canvas or a flexible display screen, so that the color body covers the gap between the picture display module 14 and the accommodating cavity 13, thereby making the furniture as a whole more beautiful and improving the user experience. The color body is mainly a pattern composed of paint, and at least has two colors. The color body is coordinated with color in the picture display module 14 enrich the color of the transparent body.

In the embodiment, it should be noted that an independent room or a living space can be used as a home environment.

In order to rationalize the structure of the furniture 1 and improve the user experience, the picture display module 14 should be provided with two or more display pictures. The display pictures of the plurality of pieces of furniture 1 are integrated in the home environment. As an example, the furniture 1 may be a mural painting on a wall 3, which is mainly used for displaying picture, and the display picture may be landscape scenery. The furniture 1 may also be a cabinet, a tea table 35 and the like arranged on ground 31, and the display picture thereof may be landscape picture, animation, and the like. The furniture constitute a scene atmosphere in the home environment, and can coordinate and synchronously change the display pictures or colors of different scenes, thus creating a variety of life scenes. It can be understood that the mural painting also include a picture display module.

Refer to FIG. 3. Specifically, the furniture according to the present invention may be cabinet type furniture, table type furniture, door type furniture, window type furniture, sofa type furniture, tea table type furniture, screen type furniture, and the like; cabinets comprise, for example, a TV cabinet 38, a cupboard, a bedside table, and the like; doors comprise, for example, a front door, a bedroom door, a cabinet door, and the like. The furniture body 11 is made of metal, glass, wood, plastic, stone, or any combination of the listed materials.

Preferably, the picture display module 14 of the present invention is directly provided on the surface or inside of the furniture body 11 and distributed in the form of C-shaped sheet (such as a turning portion A of a sofa, see FIG. 3) or plane-shaped sheet (such as a door 252, see FIG. 3), and directly forms a whole with the furniture body 11. The furniture 1, which is in the form of a plane-shaped, sheet-shaped, C-shaped geometry, or any other geometry with different shapes, can be disposed independently or can be coordinated with furniture of other materials into a new set of furniture. The furniture of other materials may have two or more pieces of furniture, and may be an individual piece of furniture of a plane-shaped sheet, can be placed separately on the floor, and can bear people or other objects.

Figure 11:
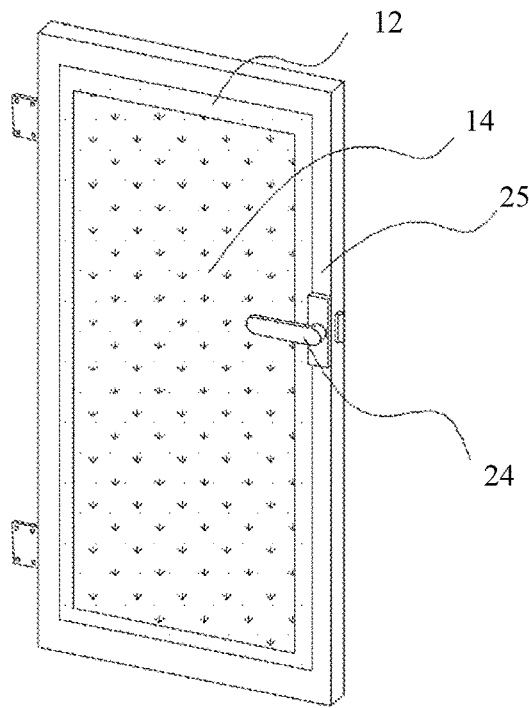
FIG. 11 is a schematic structural view of a fifth embodiment of a piece of furniture according to the present invention.

Continue to refer to FIG. 3. In one embodiment of the present invention, a plurality of pieces of furniture are arranged in the home environment, and the home environment is mainly composed of a house main body and the plurality of pieces of furniture 1. For convenience of understanding, FIG. 3 shows the home environment in a perspective drawing. The house consists of a wall, a floor 31, and a wall cover 32, which constitute six surfaces of the house, and all the life scenes displayed are distributed on the six surfaces. In the house, the plurality of pieces of furniture 1 disposed on the wall 3 or on the floor 31 constitute the home environment. As shown in FIG. 3, a cabinet 33, a sofa 34, a tea table 35, a turnable picture 36 on the floor 31, a low angle cabinet 37 and a TV cabinet 38 are placed as displayed objects; the furniture 1 on the walls 3 may comprise door type furniture embodied in a plurality of different forms, such as a door picture 251 and a room door 252. As shown in FIG. 11, the wall 3 is provided with a frame mural painting 39 within which a display unit is provided. The frame mural painting 39 includes an L-shaped corner frame mural painting 39 and a straight-faced frame mural painting 39, and can be placed in the wall 3 or on the surface of the wall 3. The plurality of pieces of furniture 1 with different shapes and functions are integrated and arranged together to form the home environment in a space composed of wall and floor, or six surfaces, which is based on more than two of them.

In the embodiment of the present invention, the control mode of the display unit comprises an automatic mode and a manual mode, which are specifically described below.

Figure 5:
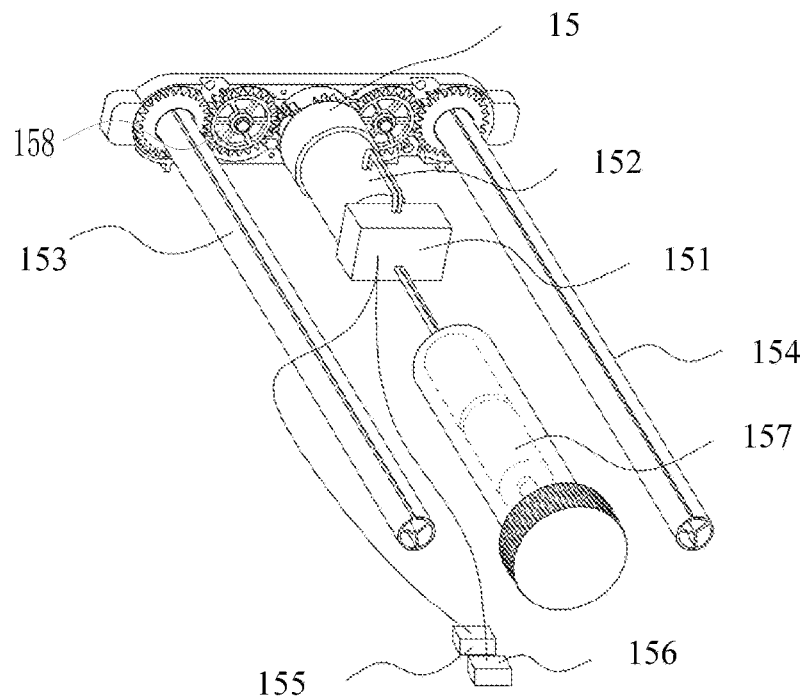
FIG. 5 is a schematic structural view of a first embodiment of a driver module according to the present invention.
Figure 6:
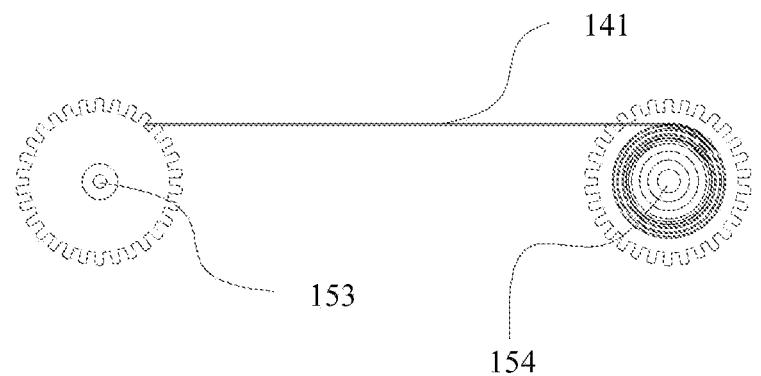
FIG. 6 is a schematic diagram of a first embodiment of a driver module according to the present invention.

Refer to FIGS. 2, 5, and 6. In the embodiment of the present invention, in order to realize the automatic mode and make the plurality of pieces of furniture 1 change their display pictures to improve the convenience of the furniture 1 and user experience, the picture display module 14 includes a multi-picture display canvas 141; the driver module 15 includes a microcontroller 151, a motor 152 and a rotating shaft, the microcontroller 151 is connected to the motor 152, an output end of the motor 152 is connected to the rotating shaft, and a bottom surface of the multi-picture display canvas 141 is rotatablely supported by the rotating shaft. Wherein, the microcontroller 151 can use an integrated circuit to input a preset program on the integrated circuit, so that the display unit operates according to the preset program. At the same time, since the microcontroller 151 is small in size and low in cost, it is advantageous to reduce the production cost of the furniture 1.

When the home environment is changed according to the user requirements, the motor 152 receives a picture change instruction issued by the microcontroller 151, and controls rotation of the rotating shaft to drive the multi-picture display canvas 141 to move, thereby changing the display picture on the multi-picture display canvas 141.

Continue to refer to FIGS. 5 and 6, in the embodiment, in a further aspect, the driver module 15 further comprises a fixing base and a power supply 157; the rotating shaft comprises a driving shaft 153 and a driven shaft 154; the fixing seat is connected to a side wall of the accommodating cavity 13, the motor 152 is connected to the fixing base, the power supply 157 is connected to the microcontroller 151, and the driving shaft 153 and the driven shaft 154 are rotatably connected to the fixing base; one end of the multi-picture display canvas 141 is rotatably wound on the driving shaft 153, and the other end of the multi-picture display canvas 141 is rotatably wound on the driven shaft 154; output shafts of the motor 152 are respectively connected to the driving shaft 153 and the driven shaft 154 through transmission gears 158. Wherein, a control end of the motor 152 is electrically connected to an output end of the microcontroller 151, a power end of the microcontroller 151 is electrically connected to the power supply 157, the driving shaft 153 and the driven shaft 154 are each in a long rod-like structure, and the driving shaft 153 and the driven shaft 154 are rotated under the driving of the drive gears 158.

The multi-picture display canvas 141 has a canvas structure and is made of a plastic sheet, a fiber or a cotton fiber. In order to make the structure reasonable, each of the driving shaft 153 and the driven shaft 154 is provided with a seam fixing part which is used to clamp the multi-picture display canvas 141, so that the multi-picture display canvas 141 moves with the rotation of the driving shaft 153 and the driven shaft 154, and the display picture is seen by the users through the transparent body 12.

When the home environment is changed according to the user requirements, the motor 152 receives a picture change instruction issued by the microcontroller 151, and drives the driving shaft 153 and the driven shaft 154 to rotate in the same direction through transmission of the transmission gears 158, so as to drive the multi-picture display canvas 141 to move, thereby changing the display picture on the multi-picture display canvas 141.

Refer to FIG. 5, in the embodiment, in a further aspect, the picture display module 14 further comprises a position sensor 155 which is connected to the microcontroller 151, a position between adjacent display pictures on the multi-picture display canvas 141 is provided with a first positioning member (not shown) for identifying a positioning signal by the position sensor 155; the positioning signal is acquired and transmitted to the microcontroller 151 by the position sensor 155, and the microcontroller 151 controls the motor 152 to stop moving according to the positioning signal, so that an old display picture is changed to a new one.

The picture display module 14 further comprises two direction sensors which are connected to the microcontroller 151. Two second positioning members (not shown) for identifying reverse signals by the direction sensors 156 are provided at both ends of the multi-picture display canvas 141; the reverse signals are recognized and transmitted to the microcontroller 151 by the direction sensors 156, and the microcontroller 151 controls the motor 152 to rotate in a reverse direction according to the reverse signals.

The multi-picture display canvas 141 is provided with a plurality of display pictures which are located between the transmitting end and the receiving end of the position sensor 155, and the output end of the position sensor 155 is connected to the input end of the microcontroller 151. After the positioning signal is obtained by the location sensor 155, it is sent to the microcontroller 151, the microcontroller 151 controls the motor 152 to stop according to the positioning signal, and starts a next timing cycle. Through repeating such procedures, when a last display picture is represented, the reverse signal is detected by the direction sensors 156 and sent to the microcontroller 151, then the microcontroller 151 reverses the output current of the motor 152 and return the reversed output current to the motor 152, so that the motor 152 operates in reverse, and the multi-picture display canvas 141 moves in reverse.

Specifically, the position sensor 155 is an optical sensor, a Hall sensor, a magnetic sensor or a micro switch, and the positioning recognizer is an optical sensor or a magnet sensor. Holes or a blank are between adjacent pictures on the display canvas, and the positioning recognizer is arranged between holes or a magnet on the blank. When holes or the magnet on the blank passes through the position sensor 155 in the middle of a display window, the position sensor 155 obtains the positioning signal and sends it to the microcontroller 151, then the microcontroller 151 controls the motor 152 to stop or operate in a reverse the direction according to the positioning signal.

There are two direction sensors 156 disposed left and right, one is responsible for turning in a left direction and the other for turning in a right direction. The direction sensors 156 are disposed on one side or both sides of the canvas. The microcontroller 151 may be composed of a liquid crystal display control panel and an integrated circuit. The rotation of the display canvas and lighting display are timing controlled in a plurality of time periods, and the timing is set by the floating setting. The timing countdown time and the clock time are displayed on the liquid crystal control panel, and the timed time is started by using a clock as a starting reference.

In the embodiment of the present application, it should be noted that, the display unit further comprises a timing module which is connected to the microcontroller 151 and is configured to control periodical start of the motor 152 to periodically change the display picture on the multi-picture display canvas 141; when the home environment is changed according to the user requirements, upon a cycle change time preset by the timing module is reached, the motor 152 receives the picture change instruction issued by the microcontroller 151 and controls the rotation of the rotating shaft to drive the multi-picture display canvas 141 to move, thereby changing the display picture on the multi-picture display canvas 141.

Wherein, the timed time setting method of the timing module comprises two methods, i.e, a floating time input method and a fixed time input method. The floating time input method is performed to edit time by pressing a button according to requirements, and then storing the set time in the microcontroller 151. The set time can be set as a unit of time in hours, minutes, and seconds, and each set time is one period of time. A plurality of set time may be combined into a cycle, such as: the first period of time 2 hours, the second period of time of 5 hours, or the like, these periods of time together form a cycle. In the fixed time input method, there are multiple timing time represented by numbers. Any one time number may be freely input according to requirements. The timed time is repeated in a selected time period, or in combination of a plurality of time periods. The plurality of time periods are repeated, such as, 1, 2, 3, 12, 24 time periods, and so on. The plurality of time periods are set as a unit of time in hours or minutes. A desired time is clicked as a timed time, when selecting.

Figure 9:
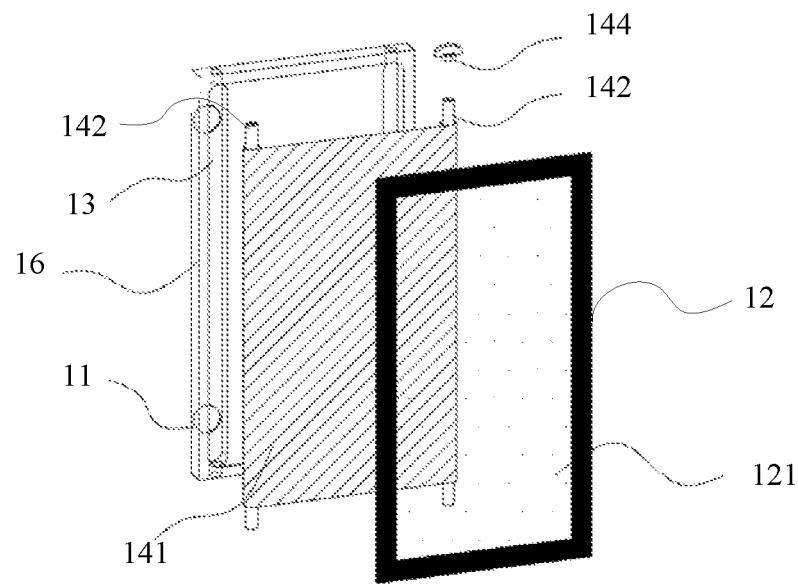
FIG. 9 is a schematic structural view of a fourth embodiment of a piece of furniture according to the present invention.
Figure 10:
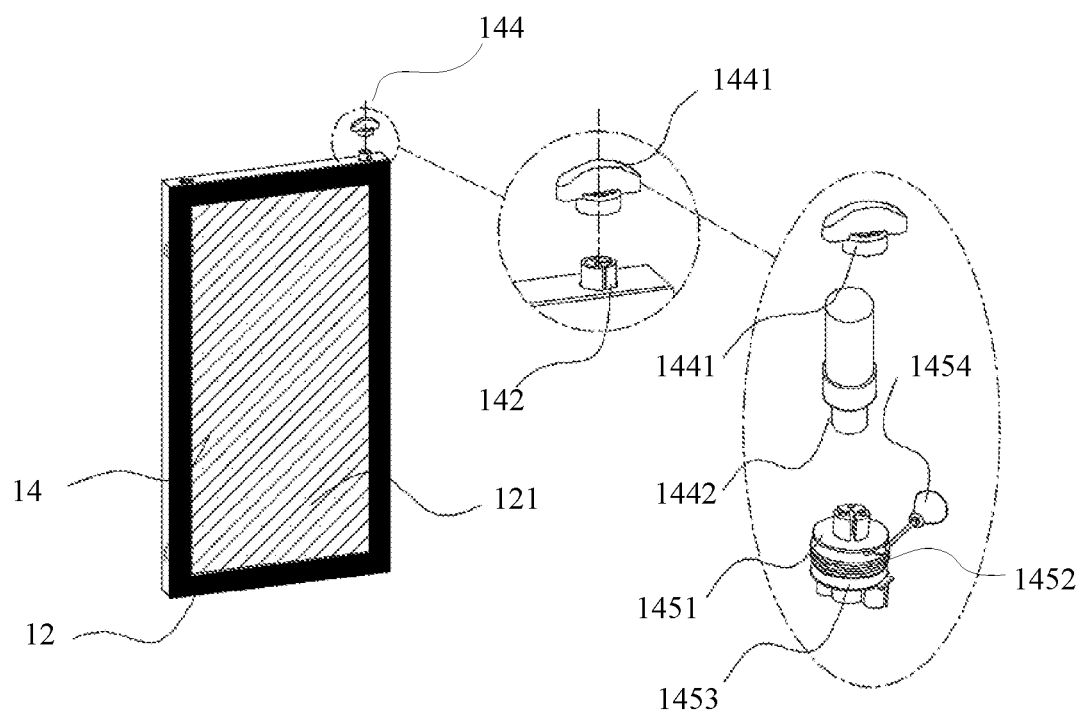
FIG. 10 is a schematic view showing use of a fourth embodiment of a piece of furniture according to the present invention.

Refer to FIGS. 9 and 10. In the embodiment of the present application, in order to perform manual operation, the picture display module 14 includes a multi-picture display canvas 141; the driver module 15 comprises a first turnable member 142, a second turnable member 143, and a rotating member 144; both the first turnable member 142 and the second turnable member 143 are rotatably connected to an inner side wall of the accommodating cavity 13, and the first turnable member 142 and the second turnable member 143 are parallel to each other; one end of the multi-picture display canvas 141 is rotatably wound on the first turnable member 142, the other end of the multi-picture display canvas 141 is rotatably wound on the second turnable member 143, and the rotating member 144 is detachably connected to one end of the first turnable member 142; when the home environment is changed according to the user requirements, the first turnable member 142 is turned through the rotation of the rotating member 144 to move the multi-picture display canvas 141 between the first turnable member 142 and the second turnable member 143, thereby changing the display picture on the multi-picture display canvas 141.

As a first manual mode, the rotating member 144 is a movable moving body 1441. When the display picture of the multi-picture display canvas 141 needs to be changed, the user places the rotating member 144 on the first turnable member 142. The first turnable member 142 and the second turnable member 143 common one handle with hollow interior and made of metal or plastic.

As a second manual mode, the driving module 15 further includes an electric rotating mechanism 1442 which is a hand-held electric screwdriver and an electric drill on the market. The first turnable member 142 is turned by rotation of the output end of the electric rotating mechanism, so that the multi-picture display canvas 141 can be rotated left and right to change the display picture, thereby changing the picture of the furniture 1.

As a third manual mode, in the embodiment of the present application, the rotating member 144 comprises a pull rope rotating member 145 which comprises a clamping member 1451, a drawstring 1452, and a sheet spring 1453; the clamping member 145 is fixed to one end of the first turnable member 142, the sheet spring 1453 is mounted on the clamping member 1451, one end of the drawstring 1452 is provided with a drawstring handle 1454, and the other end of the drawstring 1452 is wound on the sheet spring 1453; when the home environment is changed according to the user requirements, the drawstring 1452 is pulled through the drawstring handle 1454 to drive the sheet spring 1453 to tighten, so that the first turnable member 142 turns, and the multi-picture display canvas 141 moves between the first turnable member 142 and the second turnable member 143, thereby changing the display picture on the multi-picture display canvas 141.

In this embodiment, it should be noted that after the display picture on the multi-picture display canvas 141 is changed, the drawstring 1452 of the pull rope rotating member 145 is pulled into place, and the drawstring handle of the drawstring 1452 is released by the user to tighten the sheet spring 1453, so that the sheet spring 1453 releases its elastic force, and enables the stretched drawstring 1452 wind on the clamping member 1451, in order to facilitate a next operation.

Figure 4:
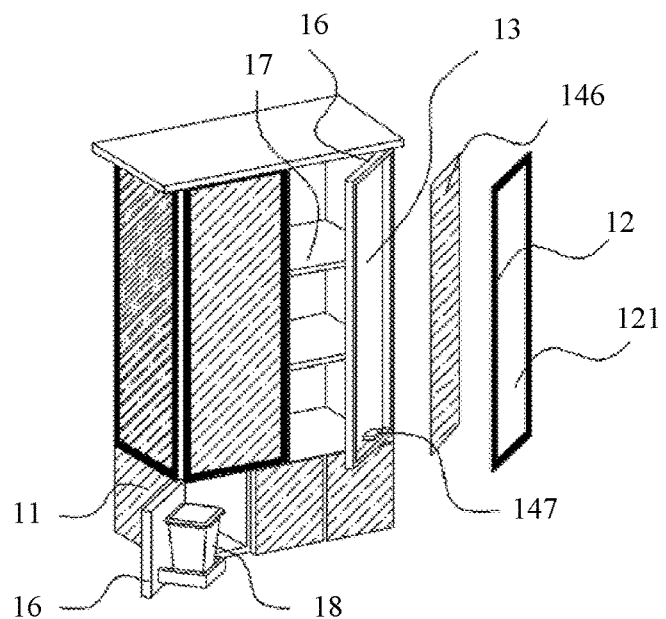
FIG. 4 is a schematic structural view of a second embodiment of a piece of furniture according to the present invention.

Refer to FIG. 4. In the embodiment of the present application, the picture display module 14 comprises a flexible display screen 146, the driver module 15 comprises a display controller 147 and a memory; the flexible display screen 146 is connected to the display controller 147, and the display controller 147 is connected to the memory; when the home environment is changed according to the user requirements, the display controller 147 receives a control instruction, acquires picture information in the memory, and transmits the picture information to the flexible display screen 146, thereby changing the display picture on the flexible display screen 146.

The flexible display screen 146 is a flexible OLED screen. The flexible display screen 146 is disposed under the transparent body 12, which is matched with the shape of the furniture body 11 and may be provided by one or more than one. The display picture uses the picture and color obtained by the existing technology or the later improved technology as a display source, and display pictures may be changed in colors individually or several display pictures may be coordinated and changed in colors. The OLED flexible screen is powered by a high voltage over 36V or a low voltage below 36V. The power supply can supply power for one OLED flexible screen, or for multiple OLED flexible screen power receivers simultaneously.

In the embodiment of the present invention, it should be noted that the flexible display screen 146 adopts an OLED flexible screen, the surface of which is flexible and foldable, and which uses the screens produced by the existing technology or the later improved technology as a display source. The screen and its system can store photos, videos, pictures, colored words, and the like in its internal memory, or can receive, by a built-in receiver, external photos, videos, pictures, colored words, and the like, through wired and wireless manners.

In addition, it can be understood that, the display pictures have a commercial promotion function, and are spread as albums or video clips, in combination with text, sound description, and the like, on a television, a mobile terminal, or an album book. Preferably, a plurality of pieces of smart furniture combine to form a living scene which acts as independent commercial display shop. The independent commercial display shop is exhibited as a commercial propaganda window, in an exhibition, a business center, a residential area, an exhibition center and so on.

In the embodiment of the present application, the display unit further comprises a wireless control module having a function of receiving a control signal from a remote controller or a mobile terminal, which is wirelessly connected to the driver module 15; the wireless control module is a wireless WiFi module, an infrared control module or a bluetooth module.

In the embodiment, the user can control the display unit by remote control, which can be in the form of wired Internet, infrared, Bluetooth, Wifi, radio, or the like. It can be understood that the remote control may be performed by an existing remote controller or a mobile terminal. The mobile terminal performs remote control by using APPs as the control source, and a terminal window as the editing source. The mobile terminal may be a mobile phone, a tablet computer, a display window, a notebook computer, and the like. Drivers may be operate individually or in combination. The remote control operation is realized by means of buttons, voice control, gravity sensor and the like.

In a further aspect, when the flexible display screen 146 is used as the picture display module 14, opening and closing of the flexible display screen 146 may be realized in a manual mode or in an electric mode. The electric mode comprises a manual start control mode and a remote control mode. The remote control mode is based on all existing control modes in the market, and can be in the form of wired Internet, infrared, Bluetooth, Wifi, radio, or the like. A remote controller is a device commonly used in the market or a mobile terminal. The mobile terminal performs remote control by using APPs as the control source, and a terminal window as the editing source. The mobile terminal may be a mobile phone, a tablet computer, a display window, a notebook computer, and the like. Drivers may be operated individually or in linkage.

Refer to FIGS. 5 and 6. In a further aspect, when the picture display module 14 is a multi-picture display canvas 141; the driver module 15 includes a microcontroller 151, a motor 152 and a rotating shaft, the microcontroller 151 is connected to the motor 152, an output end of the motor 152 is connected to the rotating shaft, and a bottom surface of the multi-picture display canvas 141 is rotatablely supported by the rotating shaft; when the home environment is changed according to the user requirements, the motor 152 receives a picture change instruction issued by the microcontroller 151, and controls rotation of the rotating shaft to drive the multi-picture display canvas 141 to move, thereby changing the display picture on the multi-picture display canvas 141.

Refer to FIG. 4. When the picture display module 14 is the flexible display screen 146, the flexible display screen 146 is disposed under the transparent body 12, which is matched with the shape of the furniture body 11 of a cupboard. When the home environment is changed according to the user requirements, the display controller 147 receives a control instruction, acquires picture information in the memory, and transmits the picture information to the flexible display screen 146, thereby changing the display picture on the flexible display screen 146.

Return to FIGS. 1, 2 and 4. The application of the present invention in cabinet furniture is further illustrated by taking a cabinet as a specific embodiment.

The furniture 1 is a cabinet, which is composed of the furniture body 11 and a plurality of cabinet doors 16. The furniture body 11 is formed by connecting and fixing sheet-shaped plates 17, and an inner wall of the cabinet door 16 in the lower left corner is provided with a garbage bin 18 which is fixed to the cabinet door 16. The cabinet door 16 is fixed by a leaflet or a hinge. When the cabinet door 16 is rotatably opened, the garbage bin 18 is opened together.

In particular, as shown in FIG. 2, each of the cabinet doors 16 is fixed to the furniture body 11 by a hinge or a leaflet, and can be opened and closed by 180 degrees. Each of the cabinet doors 16 is provided with a driver module 15 which is disposed together with the picture display module 14 in the accommodating cavity 13 formed in the cabinet door 16. The transparent body 12 is provided with a paint pattern 121 formed by paint, and the pattern is distributed around the transparent body 12. The transparent body 12 is arranged on the display surface of the picture display module 14, thereby change of the display picture of the cupboard is realized through the display module.

In the embodiment of the present application, in order to rationalize the structure, the furniture body 11 is provided with an automatic switch unit which comprises an induction module, a switch control module and a load-bearing part 2; the switch control module comprises an induction controller and an induction machine 21; an output end of the induction module is connected to the induction controller, the induction controller is connected to the induction motor 21, the load-bearing part 2 is movably connected to an output shaft of the induction motor 21 through a screw sliding assembly, and the load-bearing part 2 is provided with a garbage bin 18.

In this embodiment, the furniture 1 may be a tea table 35, a television cabinet 38, a dining table, a cupboard, or a wardrobe; the load-bearing part 2 is a drawer cabinet or a cabinet door of a pull-out furniture; the load-bearing part 2 is provided with a garbage bin 18, which improve the convenience and intelligence of the furniture 1.

Figure 7:
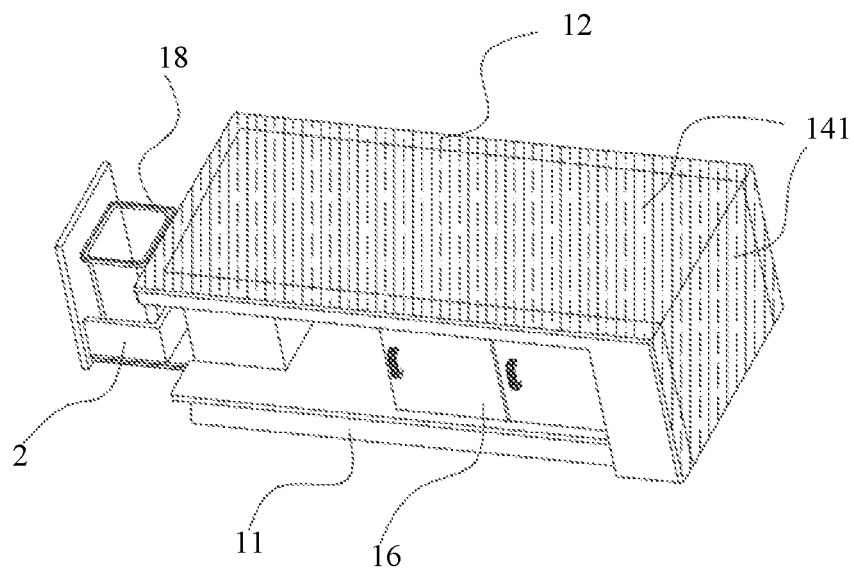
FIG. 7 is a schematic structural view of a third embodiment of a piece of furniture according to the present invention.
Figure 8:
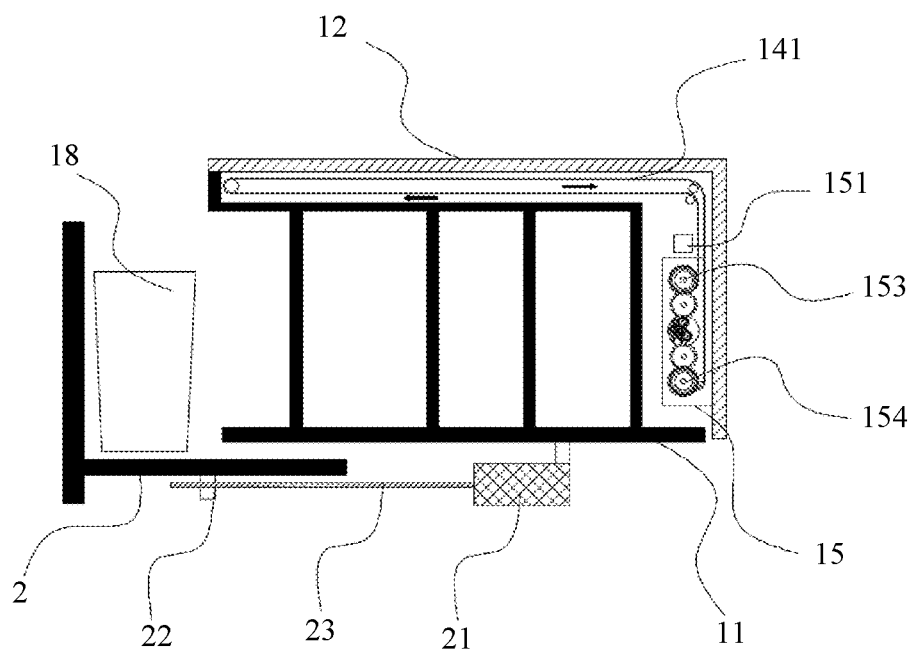
FIG. 8 is a cross-sectional view showing a third embodiment of a piece of furniture according to the present invention.

Refer to FIGS. 7 and 8. The application of the present invention in drawer furniture is further illustrated by taking a drawer as a specific embodiment.

The furniture 1 is a piece of drawer furniture, which is composed of the furniture body 11, a plurality of cabinet doors 16 and a drawer. The drawer is located on the left side of the furniture body 11 and is provided with a garbage bin 18 therein. The bottom of the drawer is arranged on a sliding track, so that the drawer slides open and close on the sliding track, and the garbage bin 18 is opened and closed together with the drawer.

In particular, as shown in FIG. 7, each of the cabinet doors 16 is fixed to the furniture body 11 by a hinge or a leaflet, and can be opened and closed by 180 degrees. The picture display module 14 may be the flexible display screen 146 or the multi-picture display canvas 141, which is arranged in an L shape on the furniture body 11.

In a further aspect, the bottom of the drawer is provided with a hollow screw fixing seat 22, and a screw 23 is disposed in the middle of the hollow screw fixing seat 22. The thread on the screw 23 are matched with the threads on the hollow screw fixing seat 22, and an end of the screw 23 is connected to an induction machine 21. The induction machine 21 is a reduction motor 152 which is fixed to the furniture body 11. The reduction motor 152 rotates in clockwise direction or in counterclockwise direction with a high voltage of 36 V or higher or a low voltage of 24 V or less, thereby driving the screw 23 to rotate, further driving the garbage bin 18 to open and close together with the drawer, which is greatly convenient to put garbage and improve the convenience and intelligence of the drawer. The reduction motor 152 is started and controlled to rotate in clockwise direction or in counterclockwise direction by combination of an integrated circuit, an inductor, a switch, a power source and the like. The inductor is an infrared inductor or a magnetic inductor, serving as a start source of positive and negative current output in the circuit.

Refer to FIG. 11. The application of the present invention in door furniture is further illustrated by taking a door as a specific embodiment.

FIG. 11 shows an embodiment of door type furniture. The door is provided with a display unit and composed of a plurality of main components. The door includes a door body, i.e., the furniture body 11. A transparent portion is embedded on the door body in which a concave cavity is formed. The transparent portion is disposed at an opening of the cavity. The picture display device may be the multi-picture display canvas 141 or the flexible display screen 146. The edge of the door body is provided with a door handle 24 and a door lock. The door body can be made of wood, metal, plastic, or a combination of the three materials. Paints of various materials and colored coatings are distributed on the door surface.

Figure 12:
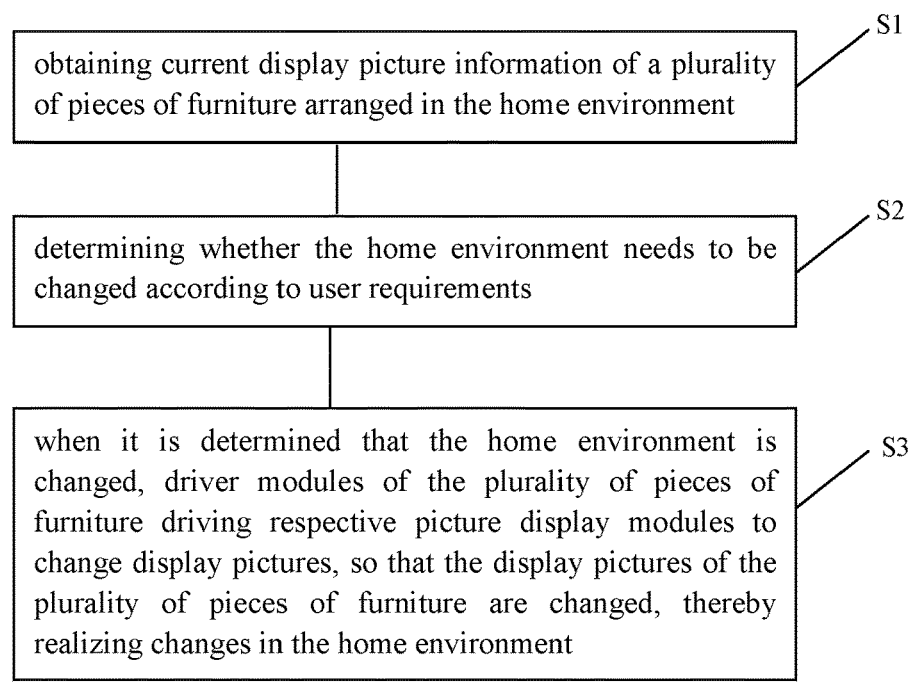
FIG. 12 is a flow chart showing a first embodiment of a control method according to the present invention.

Refer to FIG. 12. In order to solve the technical problem, the present application also provides a control method of a home environment regulation system, comprising steps of:

S1: obtaining current display picture information of a plurality of pieces of furniture 1 arranged in the home environment;

S2: determining whether the home environment needs to be changed according to user requirements;

S3: when it is determined that the home environment is changed, driver modules 15 of the plurality of pieces of furniture 1 driving respective picture display modules 14 to change display pictures, so that the display pictures of the plurality of pieces of furniture 1 are changed, thereby realizing changes in the home environment.

In the embodiment of the present application, in particular, the plurality of pieces of furniture 1 arranged in the home environment are each provided with a timer, so that the plurality of pieces of furniture 1 can be coordinated and synchronized by an automatic method, realizing simultaneous change of the display pictures of the plurality of pieces of furniture 1 in the home environment, and further changing the overall living artistic conception and the living scene of the home environment.

Figure 13:
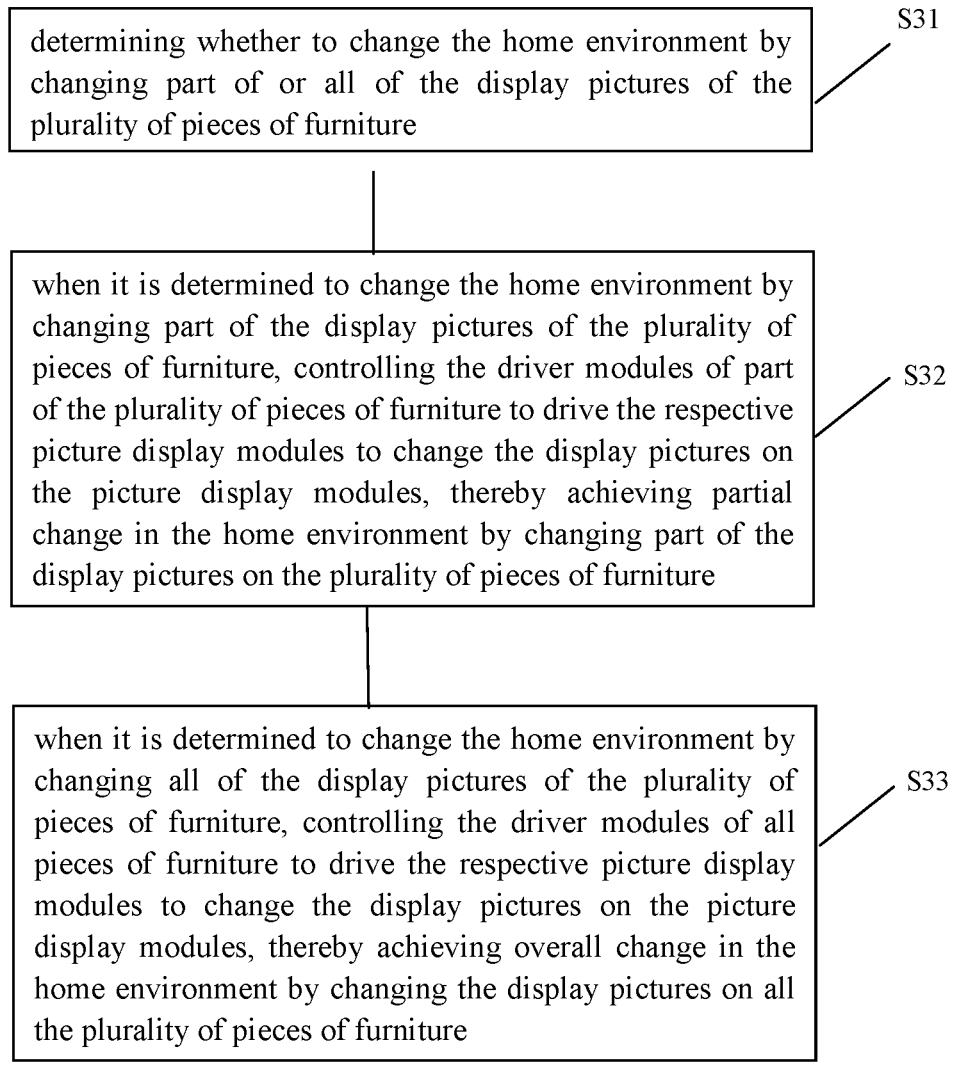
FIG. 13 is a schematic flow chart of a second embodiment of a control method according to the present invention.

Refer to FIG. 13. In the embodiment of the present application, in step S3, the step of when it is determined that the home environment is changed, driver modules 15 of the plurality of pieces of furniture 1 driving respective picture display modules 14 to change display pictures, so that the display pictures of the plurality of pieces of furniture 1 are changed, thereby realizing changes in the home environment in particular comprises:

S31: determining whether to change the home environment by changing part of or all of the display pictures of the plurality of pieces of furniture;

S32: when it is determined to change the home environment by changing part of the display pictures of the plurality of pieces of furniture, controlling the driver modules 15 of part of the plurality of pieces of furniture 1 to drive the respective picture display modules 14 to change the display pictures on the picture display modules, thereby achieving partial change in the home environment by changing part of the display pictures on the plurality of pieces of furniture;

S33: when it is determined to change the home environment by changing all of the display pictures of the plurality of pieces of furniture 1, controlling the driver modules 15 of all pieces of furniture to drive the respective picture display modules 14 to change the display pictures on the picture display modules 14, thereby achieving overall change in the home environment by changing the display pictures on all the plurality of pieces of furniture 1.

Refer to FIG. 3. As one embodiment of the present invention, the plurality of pieces of furniture 1 are arranged in the home environment, and the home environment is mainly composed of a house main body and the plurality of pieces of furniture 1. For convenience of understanding, FIG. 3 shows the home environment in a perspective drawing. The house consists of a wall, a floor 31, and a wall cover 32, which constitute six surfaces of the house, and all the life scenes displayed are distributed on the six surfaces. In the house, the plurality of pieces of furniture 1 disposed on the wall 3 or on the floor 31 constitute the home environment. As shown in FIG. 3, a cabinet 33, a sofa 34, a tea table 35, a turnable picture 36 on the floor 31, a low angle cabinet 37 and a TV cabinet 38 are placed as displayed objects; the furniture 1 on the walls 3 may comprise door type furniture embodied in a plurality of different forms, such as a door picture 251 and a room door 252. As shown in FIG. 11, the wall 3 is provided with a frame mural painting 39 within which a display unit is provided. The frame mural painting 39 includes an L-shaped corner frame mural painting 39 and a straight-faced frame mural painting 39, and can be placed in the wall 3 or on the surface of the wall 3. The plurality of pieces of furniture 1 with different shapes and functions are integrated and arranged together to form the home environment in a space composed of wall and floor, or six surfaces, which is based on more than two of them.

In conclusion, the present application provides a home environment regulation system and a control method thereof. The home environment regulation system comprises a plurality of pieces of furniture 1 arranged in a home environment, each piece of furniture 1 comprises a furniture body 11 and a display unit; an accommodating cavity 13 is provided within the furniture body 11, a surface of the furniture body 11 is provided with a transparent body 12 which is provided at an opening of the accommodating cavity 13;

The display unit is provided in the accommodating cavity 13 or on a surface of the accommodating cavity 13, and comprises a picture display module 14 and a driver module 15, the picture display module 14 is connected to the driver module 15 and provided with display pictures having various colors and patterns, the display pictures on the picture display module 14 face the transparent body 12, and the picture display module 14 is driven by the driver module 15 to change the display picture;

When the home environment is changed according to user requirements, the driver modules 15 of the plurality of pieces of furniture 1 drive the respective picture display modules 14 to change the display pictures, so that the display pictures of the plurality of pieces of furniture 1 are changed, thereby realizing change of the home environment.

It should be understood that, the picture display modules of the plurality of pieces of furniture are coordinated to form the home environment, and the picture display module may be a display terminal; the home environment is displayed in a book or an album, by using pictures and video clips, supplemented by text and sound description, to highlight a living environment, function, instructions for use and artistic conception constituted the plurality of pieces of furniture. The display terminal of the present invention includes, but is not limited to, a television display screen, a car LCD screen, a mobile phone display screen, a LED display screen.

The home environment regulation system and the control method thereof according to the present application have the following beneficial effects:

1. The combination of the display units with the furniture bodies 11 solves the problem that the home environment can only constitute a single living artistic conception due to monotonous colors and patterns of the traditional furniture; in the same home environment, when a user wants to experience different home environments with different living artistic conception, the display pictures on the plurality of pieces of furniture 1 can be changed by the display units, and changes in the display pictures on the plurality of pieces of furniture 1 arranged in the home environment brings changes in the home environment, creating different living artistic conception, maintaining the user's freshness of the home environment, and thus improving the user experience;

2. The display pictures on the picture display modules 14 face the transparent bodies 12 which can be transparent glass, transparent rubber, or the like in the furniture; the light with signals of the display pictures pass through the transparent bodies 12 to enter people's vision, the display pictures of the plurality of pieces of furniture 1 together constitute the home environment and create a living artistic conception; each piece of furniture 1 in the home environment may have different patterns, colors, styles and the like, so that changes of the plurality of pieces of furniture 1 in the home environment may constitute abundant and various living artistic conception, and help to maintain people's freshness of home environment, thereby effectively improving the user experience and satisfying people's aesthetic requirements; and 3. The display pictures on the picture display modules 14 can be set according to people's preferences, so that there may be a plurality of display pictures having different colors and patterns; preferably, the display pictures on the picture display modules 14 can together create a variety of living artistic conception with different colors and styles, which greatly meets people's needs; also, the users do not need to change their furniture to change the living artistic conception, change of the living artistic conception can be changed with the same furniture through the technical solution of the present application, which not only saves the decoration cost of home life, but also improves the user experience.

The above embodiments are preferred ones of the present invention, and it should be noted that those skilled in the art can also make improvements and modifications without departing from the principles of the present invention, which improvements and modifications are also considered as the scope of protection of the present invention.

What is claimed is:

1. A home environment regulation system based on furniture having display units, wherein, the home environment regulation system based on furniture having display units comprises a plurality of pieces of furniture arranged in a home environment, each piece of furniture comprises a furniture body and a display unit; an accommodating cavity is provided within the furniture body, a surface of the furniture body is provided with a transparent body which is provided at an opening of the accommodating cavity; the display unit is provided in the accommodating cavity or on a surface of the accommodating cavity, which comprises a picture display module and a driver module, the picture display module is connected to the driver module and provided with display pictures having various colors and patterns, the display pictures on the picture display module face the transparent body, and the picture display module is driven by the driver module to change the display picture; when the home environment is changed according to user requirements, the driver modules of the plurality of pieces of furniture drive the respective picture display modules to change the display pictures, so that the display pictures of the plurality of pieces of furniture are changed, thereby realizing change of the home environment, wherein the picture display module includes a multi-picture display canvas; the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas.

2. The home environment regulation system based on furniture having display units according to claim 1, wherein, the picture display module is driven by the driver module in an automatic mode or a manual mode.

3. The home environment regulation system based on furniture having display units according to claim 1, wherein, the driver module further comprises a fixing base and a power supply; the rotating shaft comprises a driving shaft and a driven shaft; the fixing seat is connected to a side wall of the accommodating cavity, the motor is connected to the fixing base, the power supply is connected to the microcontroller, and the driving shaft and the driven shaft are rotatably connected to the fixing base; one end of the multi-picture display canvas is rotatably wound on the driving shaft, and the other end of the multi-picture display canvas is rotatably wound on the driven shaft; output shafts of the motor are respectively connected to the driving shaft and the driven shaft through transmission gears; when the home environment is changed according to the user requirements, the motor receives a picture change instruction issued by the microcontroller, and drives the driving shaft and the driven shaft to rotate in the same direction through transmission of the transmission gears, so as to drive the multi-picture display canvas to move, thereby changing the display picture on the multi-picture display canvas.

4. The home environment regulation system based on furniture having display units according to claim 3, wherein, the picture display module further comprises a position sensor and two direction sensors, the position sensor and the two direction sensors are connected to the microcontroller, a position between adjacent display pictures on the multi-picture display canvas is provided with a first positioning member for identifying a positioning signal by the position sensor; the positioning signal is acquired and transmitted to the microcontroller by the position sensor, and the microcontroller controls the motor to stop moving according to the positioning signal, so that an old display picture is changed to a new one; two second positioning members for identifying reverse signals by the direction sensors are provided at both ends of the multi-picture display canvas; the reverse signals are recognized and transmitted to the microcontroller by the direction sensors, and the microcontroller controls the motor to rotate in a reverse direction according to the reverse signals.

5. The home environment regulation system based on furniture having display units according to claim 3, characterized in that, the display unit further comprises a timing module which is connected to the microcontroller and is configured to control periodical start of the motor to periodically change the display picture on the multi-picture display canvas; when the home environment is changed according to the user requirements, upon a cycle change time preset by the timing module is reached, the motor receives the picture change instruction issued by the microcontroller and controls the rotation of the rotating shaft to drive the multi-picture display canvas to move, thereby changing the display picture on the multi-picture display canvas.

6. The home environment regulation system based on furniture having display units according to claim 1, wherein, the picture display module further comprises a position sensor and two direction sensors, the position sensor and the two direction sensors are connected to the microcontroller, a position between adjacent display pictures on the multi-picture display canvas is provided with a first positioning member for identifying a positioning signal by the position sensor; the positioning signal is acquired and transmitted to the microcontroller by the position sensor, and the microcontroller controls the motor to stop moving according to the positioning signal, so that an old display picture is changed to a new one; two second positioning members for identifying reverse signals by the direction sensors are provided at both ends of the multi-picture display canvas; the reverse signals are recognized and transmitted to the microcontroller by the direction sensors, and the microcontroller controls the motor to rotate in a reverse direction according to the reverse signals.

7. The home environment regulation system based on furniture having display units according to claim 1, characterized in that, the display unit further comprises a timing module which is connected to the microcontroller and is configured to control periodical start of the motor to periodically change the display picture on the multi-picture display canvas; when the home environment is changed according to the user requirements, upon a cycle change time preset by the timing module is reached, the motor receives the picture change instruction issued by the microcontroller and controls the rotation of the rotating shaft to drive the multi-picture display canvas to move, thereby changing the display picture on the multi-picture display canvas.

8. The home environment regulation system based on furniture having display units according to claim 1, wherein, the picture display module comprises a flexible display screen, the driver module comprises a display controller and a memory; the flexible display screen is connected to the display controller, and the display controller is connected to the memory; when the home environment is changed according to the user requirements, the display controller receives a control instruction, acquires picture information in the memory, and transmits the picture information to the flexible display screen, thereby changing the display picture on the flexible display screen.

9. The home environment regulation system based on furniture having display units according to claim 1, wherein, the picture display module includes a multi-picture display canvas; the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned through the rotation of the rotating member to move the multi-picture display canvas between the first turnable member and the second turnable member, thereby changing the display picture on the multi-picture display canvas.

10. The home environment regulation system based on furniture having display units according to claim 9, wherein, the rotating member comprises a pull rope rotating member which comprises a clamping member, a drawstring, and a sheet spring; the clamping member is fixed to one end of the first turnable member, the sheet spring is mounted on the clamping member, one end of the drawstring is provided with a drawstring handle, and the other end of the drawstring is wound on the sheet spring; when the home environment is changed according to the user requirements, the drawstring is pulled through the drawstring handle to drive the sheet spring to tighten, so that the first turnable member turns, and the multi-picture display canvas moves between the first turnable member and the second turnable member, thereby changing the display picture on the multi-picture display canvas.

11. The home environment regulation system based on furniture having display units according to claim 1, wherein, the display unit further comprises a wireless control module having a function of receiving a control signal from a remote controller or a mobile terminal, which is wirelessly connected to the driver module; the wireless control module is a wireless WiFi module, an infrared control module or a Bluetooth module; the furniture body is provided with an automatic switch unit which comprises an induction module, a switch control module and a load-bearing part; the switch control module comprises an induction controller and an induction machine; an output end of the induction module is connected to the induction controller, the induction controller is connected to the induction motor, the load-bearing part is movably connected to an output shaft of the induction motor through a screw sliding assembly, and the load-bearing part is provided with a garbage bin.

12. The home environment regulation system based on furniture having display units according to claim 1, wherein, a periphery of the transparent body is provided with a color body, and the color body covers a periphery of the picture display module which is a multi-screen display canvas or a flexible display screen.

13. The home environment regulation system based on furniture having display units according to claim 1, wherein, the furniture is a cabinet door, the cabinet door comprises the furniture body, i.e., a cabinet door body, and a cabinet door which is provided with the accommodating cavity, and the transparent body is provided at an opening of the accommodating cavity; the display unit is disposed in the accommodating cavity or on a surface of the accommodating cavity, which comprises a picture display module and a driver module, the picture display module is connected to the driver module and provided with display pictures of various colors and images, the display pictures on the picture display module face the transparent body, and the picture display module is driven by the driver module to change the display pictures; a periphery of the transparent body is provided with a color body, and the color body covers a periphery of the picture display module which is a multi-screen display canvas or a flexible display screen; the cupboard door is an automatic cupboard door disposed on the cupboard body, the automatic cupboard door is rotatably connected to the cupboard body, and a garbage bin is provided on an inner side wall of the automatic cupboard door; when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas; or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

14. The home environment regulation system based on furniture having display units according to claim 1, wherein, the furniture is a cabinet, the cabinet comprises the furniture body, i.e., a cabinet body, a side wall of the cabinet body and a cabinet door are respectively provided with the accommodating cavity, and the transparent body is provided at an opening of the accommodating cavity; the display unit is disposed in the accommodating cavity or on a surface of the accommodating cavity, which comprises a picture display module and a driver module, the picture display module is connected to the driver module and provided with display pictures of various colors and images, the display pictures on the picture display module face the transparent body, and the picture display module is driven by the driver module to change the display pictures; a periphery of the transparent body is provided with a color body, and the color body covers a periphery of the picture display module which is a multi-screen display canvas or a flexible display screen; the cabinet door is an automatic cabinet door disposed on the cabinet body, the automatic cabinet door is rotatably connected to the cabinet body, and a garbage bin is provided on an inner side wall of the automatic cabinet door; when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas; or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

15. The home environment regulation system based on furniture having display units according to claim 1, wherein, the furniture is a door which comprises the furniture body comprising a door frame and a door panel, one side of the door panel is rotatably connected to the door frame, and the other side of the door panel is provided with a door lock and a door handle; a side wall of the door panel is provided with the accommodating cavity, and a transparent body is provided at an opening of the accommodating cavity; the display unit is disposed in the accommodating cavity or on a surface of the accommodating cavity, which comprises a picture display module and a driver module, the picture display module is connected to the driver module and provided with display pictures of various colors and images, the display pictures on the picture display module face the transparent body, and the picture display module is driven by the driver module to change the display pictures; a periphery of the transparent body is provided with a color body, and the color body covers a periphery of the picture display module which is a multi-screen display canvas or a flexible display screen; when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas; or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

16. The home environment regulation system based on furniture having display units according to claim 1, wherein, the furniture is a window which comprises the furniture body comprising a window gate, the window gate is provided with the accommodating cavity, and a transparent body is provided at an opening of the accommodating cavity; the display unit is disposed in the accommodating cavity or on a surface of the accommodating cavity, which comprises a picture display module and a driver module, the picture display module is connected to the driver module and provided with display pictures of various colors and images, the display pictures on the picture display module face the transparent body, and the picture display module is driven by the driver module to change the display pictures; a periphery of the transparent body is provided with a color body, and the color body covers a periphery of the picture display module which is a multi-screen display canvas or a flexible display screen; when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas; or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

17. The home environment regulation system based on furniture having display units according to claim 1, wherein, the furniture is a table or a tea table; when the furniture is a table, the table comprises the furniture body, i.e, a table body, one side wall of the table body is provided with the accommodating cavity, and the transparent body is provided at an opening of the accommodating cavity; when the furniture is a tea table, the tea table comprises the furniture body, one side wall of the furniture body is provided with the accommodating cavity, and the transparent body is provided at an opening of the accommodating cavity; wherein, the display unit is disposed in the accommodating cavity or on a surface of the accommodating cavity, which comprises a picture display module and a driver module, the picture display module is connected to the driver module and provided with display pictures of various colors and images, the display pictures on the picture display module face the transparent body, and the picture display module is driven by the driver module to change the display pictures; a periphery of the transparent body is provided with a color body, and the color body covers a periphery of the picture display module which is a multi-screen display canvas or a flexible display screen; when the picture display module is a multi-picture display canvas, the driver module includes a microcontroller, a motor and a rotating shaft, the microcontroller is connected to the motor, an output end of the motor is connected to the rotating shaft, and a bottom surface of the multi-picture display canvas is rotatably supported by the rotating shaft; when the home environment is changed according to the user requirements, the motor receives a picture change instruction issued by the microcontroller, and controls rotation of the rotating shaft to drive the multi-picture display canvas to move, thereby changing the display picture on the multi-picture display canvas; or, the driver module comprises a first turnable member, a second turnable member, and a rotating member; both the first turnable member and the second turnable member are rotatably connected to an inner side wall of the accommodating cavity, and the first turnable member and the second turnable member are parallel to each other; one end of the multi-picture display canvas is rotatably wound on the first turnable member, the other end of the multi-picture display canvas is rotatably wound on the second turnable member, and the rotating member is detachably connected to one end of the first turnable member; when the home environment is changed according to the user requirements, the first turnable member is turned by rotation of the rotating member to move the multi-picture display canvas between the first turnable member and the second turnable member, thereby changing the display picture on the multi-picture display canvas.

* * * * *